(12) United States Patent
Joannopoulos et al.

(10) Patent No.: US 6,573,813 B1
(45) Date of Patent: Jun. 3, 2003

(54) ALL-DIELECTRIC COAXIAL WAVEGUIDE WITH ANNULAR SECTIONS

(75) Inventors: John D. Joannopoulos, Belmont, MA (US); Yoel Fink, Cambridge, MA (US); Mihai Ibanescu, Cambridge, MA (US); Edwin Thomas, Natick, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/551,908

(22) Filed: Apr. 19, 2000

Related U.S. Application Data

(60) Provisional application No. 60/130,681, filed on Apr. 23, 1999.

(51) Int. Cl.[7] ............................................. H01P 3/18
(52) U.S. Cl. ................................. 333/342; 333/249
(58) Field of Search ............................. 333/239, 242, 333/249

(56) References Cited

U.S. PATENT DOCUMENTS 4,216,449 A * 8/1980 Kach ....................... 333/242 X
4,372,648 A    2/1983 Black
4,436,368 A    3/1984 Keck
5,675,690 A   10/1997 Nouchi et al.
6,281,769 B1 * 8/2001 Fiedziuszko ................ 333/239

FOREIGN PATENT DOCUMENTS

GB        2 116 744 A     3/1983

OTHER PUBLICATIONS

Krall, Albert et al ; "Dielectric Transmission Line" *Navy Technical Disclosure Bulletin*; vol. VII No. 1; Sep. 1981, Washington D.C; pp. 33–37.*

* cited by examiner

*Primary Examiner*—Benny Lee
(74) *Attorney, Agent, or Firm*—Fish & Richardson P.C.

(57) ABSTRACT

An all-dielectric coaxial waveguide comprising a dielectric core region; an annulus of dielectric material, surrounding the core region, in which electromagnetic radiation is confined; and an outer region of cylindrically coaxial dielectric shells of alternating indices of refraction surrounding the annulus. The core region and the outer region have an average index of refraction which is higher than the index of refraction of the annulus.

12 Claims, 9 Drawing Sheets m=0 m=1 m=2 m=3

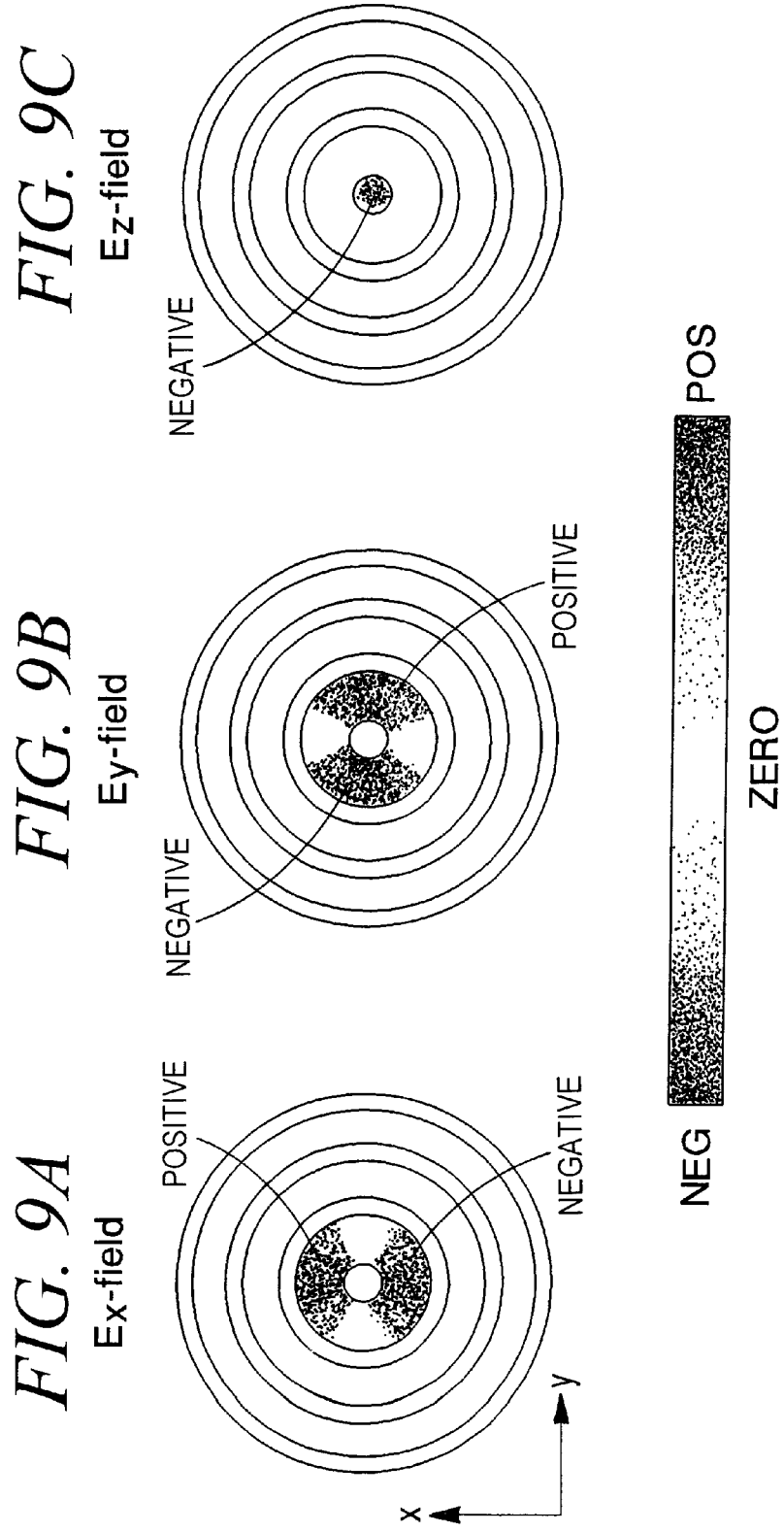

ALL-DIELECTRIC COAXIAL WAVEGUIDE WITH ANNULAR SECTIONS

PRIORITY INFORMATION

This application claims priority from provisional application Ser. No. 60/130,681 filed Apr. 23, 1999.

This invention was made with government support under Grant Number DAAG55-97-1-0366 awarded by the Army and Grant Number DMR-9808941 awarded by the National Science Foundation. The government has certain rights in the invention.

BACKGROUND OF THE INVENTION

The invention relates to the field of waveguiding, and in particular to an all-dielectric coaxial waveguide.

In Equations 1–4, E and B denote the electric and magnetic fields, respectively, with $E_z$ and $B_z$ giving the respective field component along the z-axis, and $E_{TEM}$ and $B_{TEM}$ giving the respective field components for the TEM wave; $e_z$ is a unit vector along the z-axis; $\mu$ and $\in$ are the permeability and permittivity, respectively, of the medium within which the EM wave travels; c is the speed of light; $k_z$ is the axial wave number; and $\omega$ is the angular frequency of the EM wave.

Waveguides are the backbone of modern optoelectronics and telecommunications systems. There are currently two major, and very distinct, types of waveguides (metallic and dielectric) that are employed in two separate regimes of the electromagnetic spectrum, e.g., optical and radio. For radio frequencies, it is the metallic coaxial cable that is of greatest prominence.

By enclosing a single conducting wire in a dielectric insulator and an outer conducting shell, an electrically shielded transmission circuit called coaxial cable is obtained. In a coaxial cable, the electromagnetic field propagates within the dielectric insulator, while the associated current flow is restricted to adjacent surfaces of the inner and outer conductors. As a result, coaxial cable has very low radiation losses and low susceptibility to external interference. Coaxial cables were originally developed for communications, and are used currently for broad band audio and video signals and for data transmission in computer networks.

The solutions to Maxwell's equations in the coaxial cable configuration generally support transverse electric (TE) and transverse magnetic (TM) modes as well as a particular form, which is called the transverse electromagnetic (TEM) wave. In this solution, both the electric and magnetic fields are transverse to the propagation vector k.

$$E_z = B_z = 0 \qquad (1)$$

The transverse component of the electric field satisfies, $$\left(\nabla^2 - \frac{\partial^2}{\partial z^2}\right) \times \vec{E}_{TEM} = 0 \qquad (2)$$

$$\left(\nabla^2 - \frac{\partial^2}{\partial z^2}\right) \cdot \vec{E}_{TEM} = 0$$

The magnetic field is given by, $$\vec{B}_{TEM} = \pm \sqrt{\mu \in} e_z \times \vec{E}_{TEM} \qquad (3)$$

As a result the axial wave number assumes the infinite medium value, $$k_z = \frac{\omega}{c}\sqrt{\mu\varepsilon} \qquad (4)$$

which implies the absence of a cutoff value since all the values of k are real.

The TEM mode is unique in that it has radial symmetry in the electric-field distribution and a linear relationship between frequency and wave vector. This gives the TEM mode two exceptional properties. The radial symmetry implies that one need not worry about possible rotations of the polarization of the field after it passes through the waveguide. In addition, the linear relationship assures that a pulse of different frequencies will retain its shape as it propagates along the waveguide. The crucial disadvantage of a coaxial metallic waveguide is that it is useless at optical wavelengths because of heavy absorption losses in the metal. For this reason, optical waveguiding is restricted to the use of dielectric materials. However, because of the differences in boundary conditions of the electromagnetic fields at metal and dielectric surfaces, it has not been previously possible to recreate a TEM-like mode with all-dielectric materials.

Consequently, optical waveguiding is performed using the traditional index-guiding, i.e., total internal reflection, mechanism as exemplified by the silica and chalcogenide optical fibers. Such dielectric waveguides can achieve very low losses. Although the optical fiber has proven to be undeniably successful in many ways, it is nevertheless plagued by two fundamental problems. Because the fundamental mode in the fiber has an electric field with two-fold p-like symmetry, the polarization of light coming in one end of the fiber and the polarization coming out the other are generally completely different. This leads to significant problems when coupling into polarization dependent devices. In addition, because the guiding involves total internal reflection, it is not possible for light to travel in a fiber with a sharp bend whose radius of curvature is less than 3 mm without significant scattering losses. For light at optical wavelengths, this is a comparatively enormous radius, thus limiting the scale of possible miniaturization.

Recently, however, all-dielectric waveguides have been introduced that confine optical light by means of one-dimensional and two-dimensional photonic bandgaps. Although single-mode propagation is still two-fold p-like symmetric, these new designs have the potential advantage that light propagates mainly through the empty core of a hollow waveguide, thus minimizing effects associated with material non-linearities and absorption losses. Moreover, since confinement is provided by the presence of at least a partial photonic bandgap, this assures that light should be able to be transmitted around a bend with a smaller radius of curvature than for the optical fiber.

SUMMARY OF THE INVENTION

The invention provides an all-dielectric coaxial waveguide, which combines some of the best features of the metallic coaxial cable and the dielectric waveguides. The all-dielectric coaxial waveguide supports a fundamental mode that is very similar to the TEM mode of the metallic coaxial cable. It has a radially symmetric electric field distribution so that the polarization is maintained throughout propagation. It can be designed to be single-mode over a wide range of frequencies. In addition, the mode has a point of intrinsic zero dispersion around which a pulse can retain its shape during propagation, and this point of zero dispersion can be placed in the single-mode frequency window.

Finally, the coaxial omniguide can be used to guide light around sharp bends whose radius of curvature can be as small as the wavelength of the light. This waveguide design is completely general and holds over a wide range of structural parameters, materials, and wavelengths. The coaxial waveguide of the invention represents the first successful attempt to bridge the disparate modal regimes of the metallic coaxial cable and the dielectric waveguides.

In accordance with an exemplary embodiment, the invention provides an all-dielectric coaxial waveguide comprising a dielectric core region; an annulus of dielectric material, surrounding the core region, in which electromagnetic radiation is confined; and an outer region of cylindrically coaxial dielectric shells of alternating indices of refraction surrounding the annulus. The core region and the outer region have an average index of refraction which is higher than the index of refraction of the annulus.

In general, in another aspect, the invention features an all-dielectric coaxial waveguide which supports a transverse electromagnetic wave that is similar to a TEM mode supported in a metallic coaxial cable. In yet another aspect, the invention features an all-dielectric coaxial wave guide having a fundamental electromagnetic wave guided mode that is axially symmetric, has predominantly radial electric field, and linear dispersion for a range of frequencies.

BRIEF DESCRIPTION OF THE DRAWINGS

The file of this patent contains at least one drawing (FIGS. 7A–D and 9A–C) executed in color. Copies of this patent with color drawings will be provided by the Patent and Trademark Office upon request and payment of the necessary fee.

FIGS. 9A, 9B, and 9C are power density graphs showing the distribution of the $E_x$, $E_y$, and $E_z$ electric field components, respectively, for the m=0 mode of the coaxial omniguide of FIG. 5C, and where angular frequency $\omega$ is expressed in units of $2\pi c/a$ and the axial wave vector $k_z$ is expressed in units of $2\pi/a$, and the components are defined with respect to the Cartesian coordinate system shown in FIG. 9A.

DETAILED DESCRIPTION OF THE INVENTION

Figure 1:
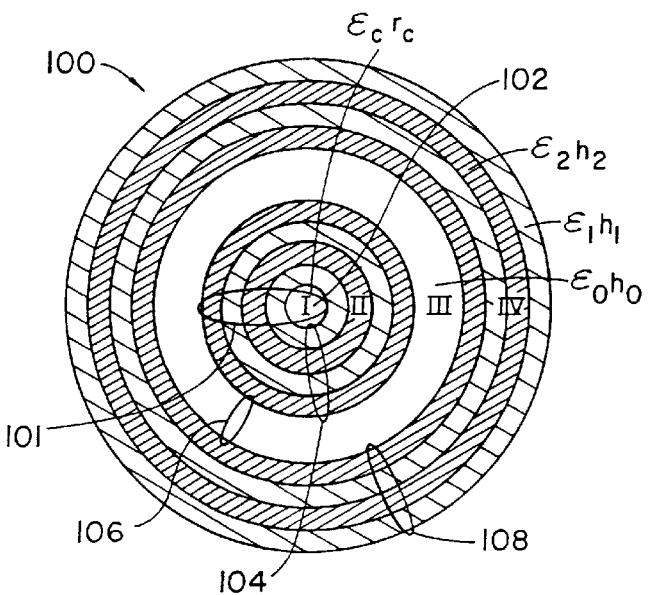
FIG. 1 is a cross sectional view of an exemplary embodiment of an all-dielectric coaxial waveguide in accordance with the invention.

FIG. 1 is a cross sectional view of an exemplary embodiment of an all-dielectric coaxial waveguide 100 in accordance with the invention. The waveguide 100 (or omniguide) consists of an array of concentric cylindrical shells including dielectric media assembled to form a cylinder. Each layer has a prescribed thickness and dielectric constant (index of refraction) chosen to achieve omnidirectional reflection. Upon the establishment of omnidirectional reflectivity, certain electromagnetic waves will be confined to the lowest dielectric constant material.

The waveguide 100 has three distinct regions. First, a core region 101 having a core region part 102, which can be of low dielectric constant material, and a core region part 104 that surrounds part 102 and is made of concentric rings or cylindrically coaxial shells of alternating thickness and dielectric constants. A low dielectric constant layer or annulus region 106, typically of larger thickness, surrounds the core region 101. An outer region 108 of another series of concentric rings or cylindrically coaxial shells of alternating thickness and dielectric constants surrounds the annulus. The choice of dielectric constants and layer thickness establishes omnidirectional reflection conditions and leads to the confinement of certain electromagnetic waves to the low dielectric constant annulus. As illustrated, the shells have dielectric constants $\in_n$ and characteristic lengths $h_n$, with n=0, 1, 2, . . . , while the core has a radius $r_c$ and dielectric constant $\in_c$. The annulus is the waveguiding region since the solutions of Maxwell's equations are confined in the plane but may have a propagating component in the z direction.

Figure 2:
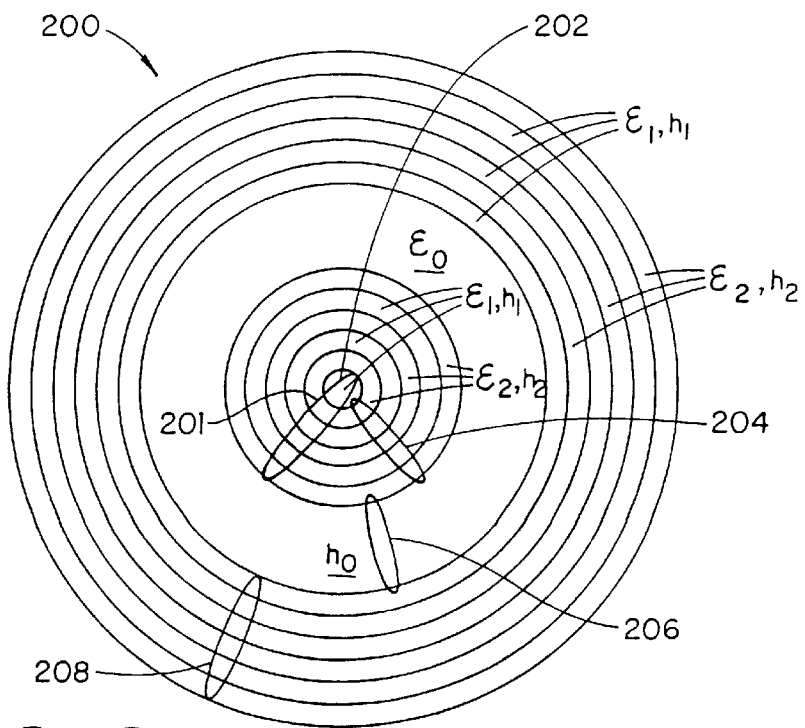
FIG. 2 is a cross sectional view of another exemplary embodiment of an all-dielectric coaxial waveguide in accordance with the invention.
Figure 3:
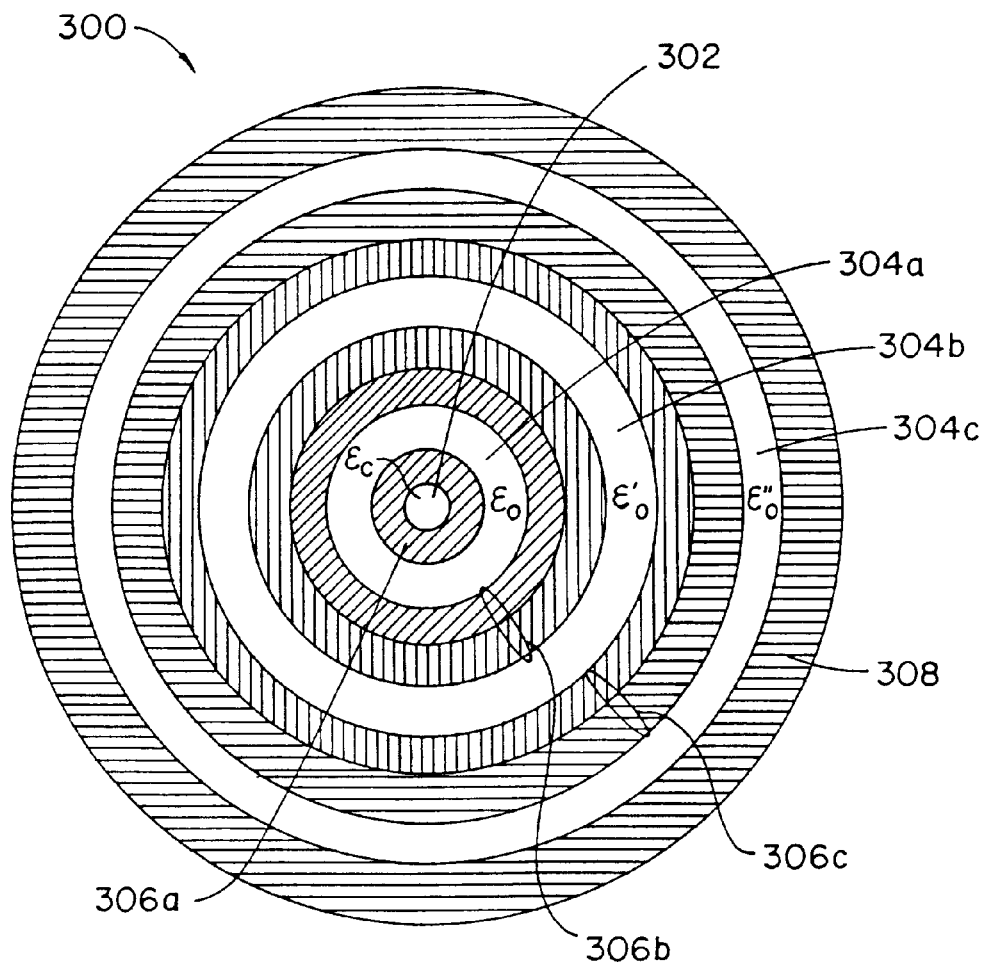
FIG. 3 is a cross sectional view of another exemplary embodiment of an all-dielectric coaxial waveguide in accordance with the invention.

Further exemplary embodiments of the coaxial waveguide are presented in FIGS. 2 and 3. FIG. 2 is a cross sectional view of another exemplary embodiment of an all-dielectric coaxial waveguide 200 in accordance with the invention. The waveguide 200 includes a core region 201 having a core region part 202 that has a dielectric constant equal to one of the alternate layers or cylindrically coaxial shells of a core region part 204 surrounding the core region part 202. The shells of the core region part 204 have alternating dielectric constants. An annulus 206 of low dielectric material surrounds the core region part 204 and is the region in which electromagnetic radiation is principally confined. An outer region 208 of concentric rings or cylindrically coaxial shells of alternating thickness and dielectric constants surrounds the annulus. As illustrated, the shells have dielectric constants $\in_n$ and characteristic lengths $h_n$, with n=0, 1, 2, . . . , while the core region part 202 dielectric constant is $\in_n=\in_l$ and the radius is $r_c=h_l$.

FIG. 3 is a cross sectional view of another exemplary embodiment of an all-dielectric coaxial waveguide 300 in accordance with the invention. The structure of waveguide 300 is similar to the basic coaxial structure of waveguide 100 of FIG. 1, specifically including a core region part 302, a plurality of low dielectric material rigs or annuli 304a, 304b, 304c sandwiched between two omnidirectional regions 306a, 306b, 306c, 308. Each of the regions 306a–306c and 308 include a series of layers or shells of alternating dielectric constant. This structure sequence can be repeated any desired number of times. The characteristic thickness and dielectric constants of each of the repeated structures can be chosen independently to provide confinement to certain frequencies which can be the same or different.

As illustrated in FIG. 3, each of the regions 306a–306c and 308 represents a multilayer film of dielectric layers such as those shown as regions 104 and 108 in FIG. 1. The regions or annuli 304a, 304b, and 304c correspond to waveguiding regions of dielectric constant $\in_0$, $\in'_0$, and $\in''_0$, respectively. The core region part 302 has a dielectric constant $\in_c$. The dielectric constant, $\in_c$, can be chosen to be a low dielectric material in which electromagnetic radiation can be confined. The use of all dielectric materials allows for very low loss waveguiding at various wavelengths including optical and microwave frequencies.

Figure 4:
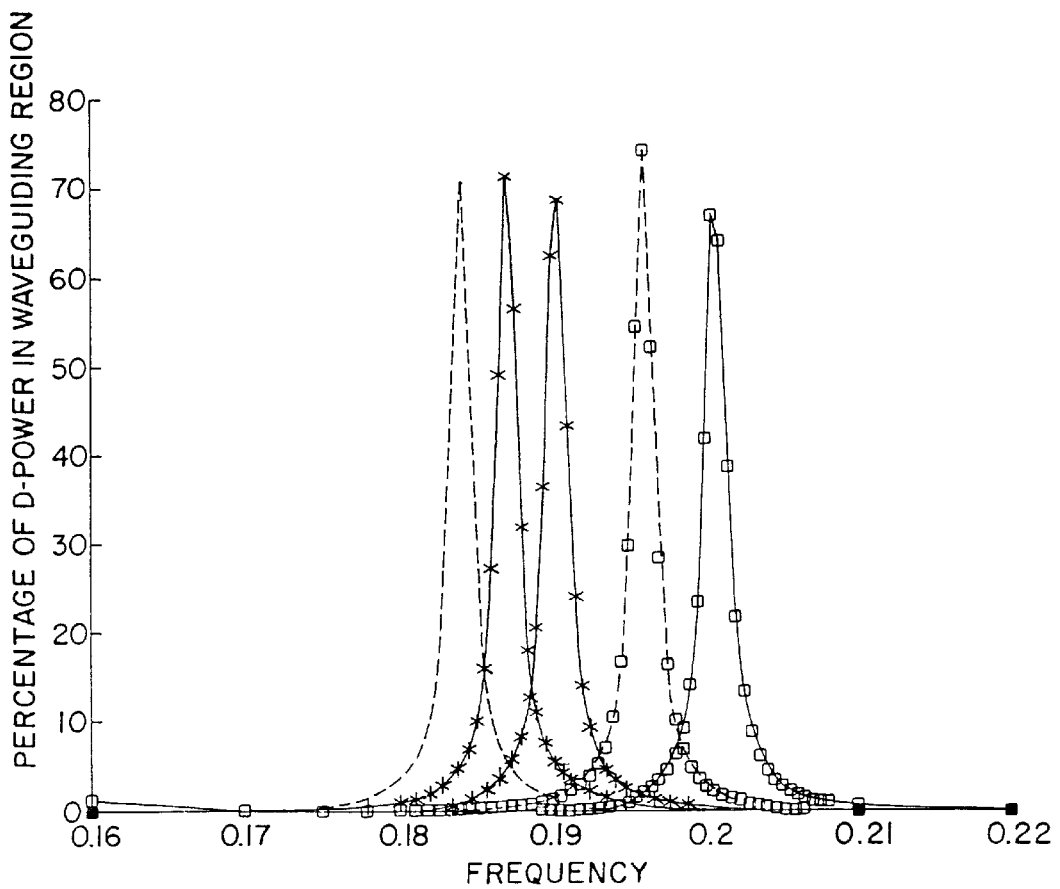
FIG. 4 is a graph of the percentage of electric displacement field (D) power in the waveguiding region 206 as a function of frequency for different TE and TM confined modes (corresponding to each of the different curves) for the waveguide 200 of FIG. 2.

The solutions of Maxwell's equations in the coaxial waveguide structure can be confined to the high dielectric regions, or the low dielectric regions, or not be confined at all. In this analysis we are particularly interested in the characteristics of the modes confined to the low dielectric waveguiding regions. The existence of these modes has been demonstrated both numerically and analytically. FIG. 4 is a graph of the percentage of displacement field (D) power in the waveguiding region 206 as a function of frequency for different TE and TM confined modes (corresponding to each of the different curves) for the waveguide 200 of FIG. 2, where the frequency is expressed in units of $2\pi c/a$. The metallic-like characteristics of a number of confined electromagnetic modes in the omniguide suggests the existence of a TEM wave in the low dielectric waveguiding medium which is similar to the TEM mode that exists in coaxial metallic waveguides.

Figure 5A:
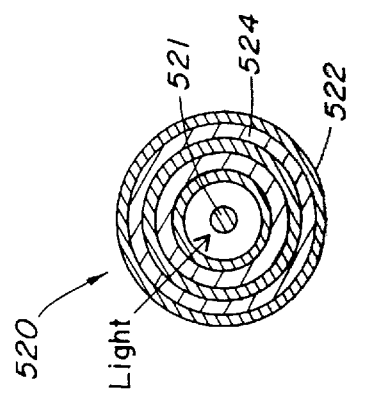
FIG. 5A is a cross sectional view of a conventional metallic coaxial waveguide.
Figure 6B:
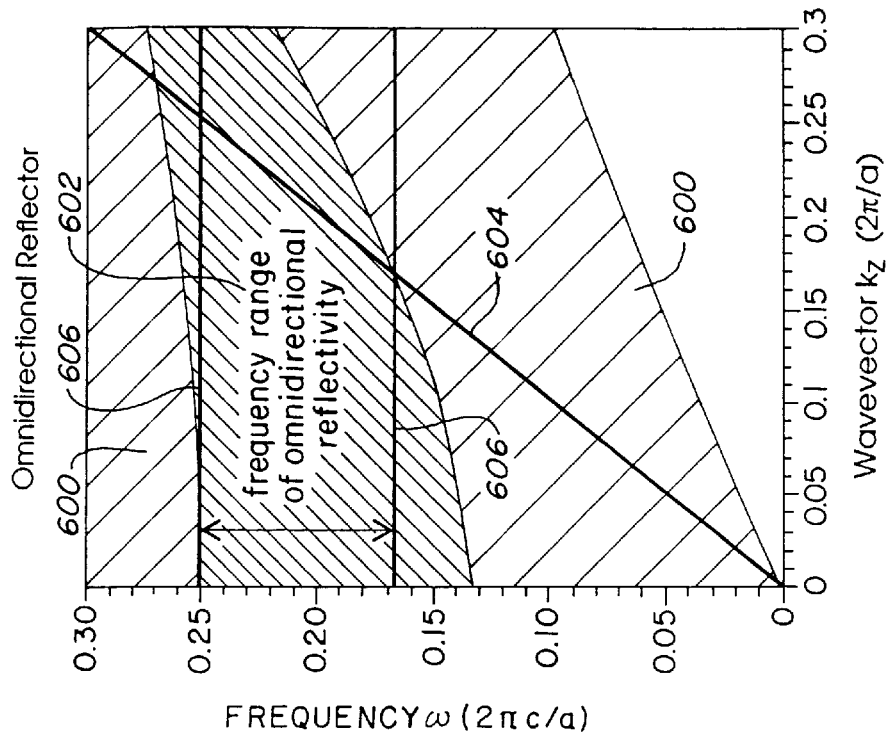
FIG. 6B is a graph of the projected band structure of an omnidirectional mirror, which includes a region of omnidirectional reflectivity corresponding to a frequency range for which there are no propagating modes in the mirror for wavevectors above the light cone $\omega = ck_z$.
Figure 6A:
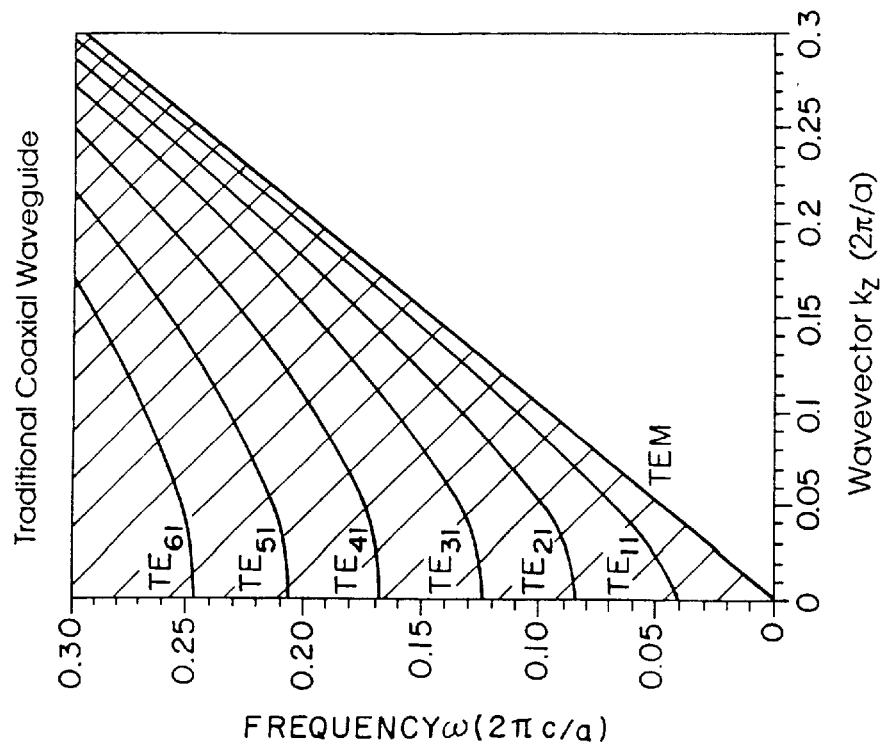
FIG. 6A is a graph of the dispersion relations for the first few modes (labeled TEM, $TE_{11}$, $TE_{21}$, $TE_{31}$, $TE_{41}$, $TE_{51}$, and $TE_{61}$) supported by a metallic coaxial waveguide.

To further explain the invention, the following comparative discussion is provided. FIG. 5A is a cross sectional view of a conventional metallic coaxial waveguide 500. Light is confined in the region 506 between the two metal cylinders 502, 504 and travels in the axial direction (perpendicular to the plane of the figure). In a simple ray model, propagation of light through the coaxial cable can be viewed as a result of successive specular reflections off the metal walls. The dispersion relations for the first few modes supported by a metallic coaxial waveguide are shown in the graph of FIG. 6A. For definiteness, the inner and outer radii of the waveguiding region are taken to be $r_i=3.00a$ and $r_o=4.67a$, respectively, where a is an arbitrary unit of length to be defined later. For any value of the wave vector, the lowest frequency mode is the TEM mode for which both the electric and magnetic fields are transverse to the direction of propagation. This mode has zero angular momentum, which means that the mode is invariant under rotations around the axial direction. Another useful property of this mode is its constant group velocity, which makes it dispersionless at any frequency.

The other modes shown in the plot are transverse electric ($TE_{mn}$) modes for n=1 and varying angular momenta m. The waveguide also supports transverse magnetic (TM) modes, but they do not appear in the plot because the cut-off frequency for the lowest lying TM mode is larger than 0.30 ($2\pi c/a$). The cut-off frequency $\omega_{cut-off}$ of any of these modes is of the farm $$\omega_{cut-off} = \frac{c}{r_o} f\left(\frac{r_o}{r_i}\right),$$

where $f$ is the solution to a transcendental equation for each value of the angular momentum m and for each polarization (TE or TM), c is the speed of light, and $r_o$ and $r_i$ are the inner and outer radii, respectively, of the waveguiding region.

Designing an all-dielectric waveguide with similar principles of operation as the metallic coaxial waveguide is not straightforward because the boundary conditions on a dielectric-dielectric interface differ from those on an air (dielectric)—metal interface. In particular, specular reflections can not be obtained on a dielectric-dielectric interface when the ray of light comes from the region with a lower index of refraction. Thus, it has generally been assumed that an all-dielectric coaxial waveguide cannot be designed to support a TEM-like mode, even in principle. However, recent research on the omnidirectional dielectric reflector has opened new possibilities for reflecting, confining, and guiding light with all-dielectric materials.

The omnidirectional dielectric reflector, or simply the dielectric mirror, is a periodic multi-layered planar structure consisting of alternating layers of low and high indices of refraction. This structure can be designed so that there is a range of frequencies for which incoming light from any direction and of any polarization is reflected. Moreover, the electric fields of the reflected light in this frequency range have corresponding phase shifts that are quite close to those acquired upon reflection from a metal. In fact, there is a frequency for each angle of incidence and each polarization, for which the phase shift is identical to that of a metal. This observation, together with the fact that high reflectivity of the omnidirectional dielectric mirror is maintained for all angles of incidence, strongly suggests exploring the possibilities of employing an omnidirectional mirror in lieu of a metal in coaxial cable designs. In effect, the omnidirectional dielectric mirror provides a new mechanism for guiding optical and infrared light without incurring the inherent losses of a metal.

Figure 5B:
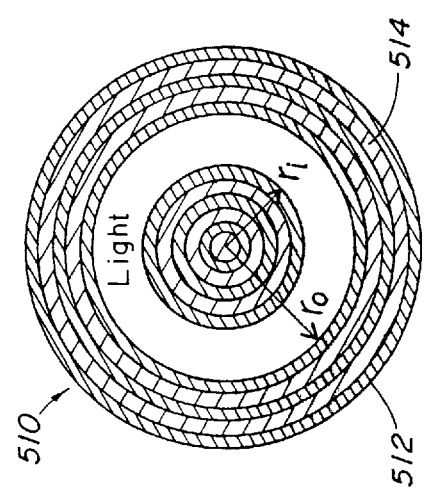
FIGS. 5B and 5C are cross sectional views of exemplary embodiments of coaxial waveguides (omniguides) in accordance with the invention, where $r_i$ and $r_o$ give the inner and outer radii, respectively, of the waveguiding region, which is denoted by the term "light" in FIGS. 5B and 5C; the Cartesian coordinate system for axes X, Y, and Z for all of the figures is shown in the bottom left corner of FIG. 5A.

FIGS. 5B is a cross sectional view of an exemplary embodiment of a coaxial waveguide (omniguide) 510 in accordance with the invention, in which the metal cylinders have been replaced with cylindrical dielectric layers associated with an omnidirectional mirror. The waveguide is coaxial and the multilayer film is chosen so that there exists a frequency range of omnidirectional reflectivity. Both of these properties are important in order to create a TEM-like mode. The parameters of the dielectric layers are taken from the hollow-waveguide experiment to be the following: layers 512 have an index of refraction $n_1=4.6$ and thickness $d_1=0.33a$, while layers 514 have an index of refraction $n_2=1.6$ and $d_2=0.67a$. Here, $a=d_1+d_2$ is the unit length of periodicity of the multi-layered structure. The inner and outer radii of the waveguiding region are taken to be $r_i=3.00a$ and $r_o=4.67a$, respectively, where a is an arbitrary unit of length for coaxial waveguide 200. For the calculations presented here, the index of refraction of the coaxial waveguiding region is set to be 1. In practice, the waveguiding region will be a dielectric with a low index of refraction.

It is instructive to review the modes of a planar omnidirectional dielectric mirror. The projected band structure of an omnidirectional mirror is shown in the graph of FIG. 6B. The regions 600 represent allowed propagation modes of light within the dielectric mirror. The region 602 represents modes for which light is forbidden to propagate within the dielectric. The diagonal line 604 identifies the edge of the light cone, and the horizontal lines 606 demarcate the frequency range of omnidirectional reflectivity. It is precisely within this range of frequencies that one would expect the coaxial omniguide to support modes that are most reminiscent of those of the metallic coaxial cable. To calculate the frequencies and field patterns of the modes of the coaxial omniguide 510, one would proceed as described below.

As a result of the cylindrical symmetry of the system, there are two good "conserved quantities" that can be used to specify and classify the various modes supported by this wave-guide. These are $k_z$, the axial component of the wave vector, and m, the "angular momentum" (m=0,1,2 ... ). For a given mode, the radial and angular components of the electric and magnetic fields can be calculated from the corresponding z (axial) components. For a given wave vector $k_z$ and angular momentum m, the axial field components in a layer of index n have the general form $$F(z,r,\phi) = (A \cdot J_m(k_T r) + B \cdot Y_m(k_T r)) \cdot (C_1 e^{im\phi} + C_2 e^{-im\phi}) \cdot e^{i(\omega t - k_z z)}, \quad (5)$$

where F stands for either $E_z$ or $H_z$; $J_m$ and $Y_m$ are Bessel functions of the first and second kind, respectively; and $k_T$ is a transverse wave vector $k_T = \sqrt{(n\omega/c)^2 - k_z^2}$.

The modes of the coaxial omniguide are calculated using two different approaches. The first is a semi-analytic approach based on the transfer-matrix method. Starting from Maxwell's equations, the z components of the electric and magnetic fields in each layer can be written in the general form given by equation (5). For given $k_z$, w, and m, the only variables that determine the $E_z$ and $H_z$ fields are the four coefficients in front of the Bessel functions (two for $E_z$ and two for $H_z$). The boundary conditions at the interfaces between adjacent layers can be written in the form of a matrix equation:

$$\begin{pmatrix} A \\ B \\ A' \\ B' \end{pmatrix}_{j+1} = M \cdot \begin{pmatrix} A \\ B \\ A' \\ B' \end{pmatrix}_j \quad (6)$$

where $$\begin{pmatrix} A \\ B \\ A' \\ B' \end{pmatrix}_j$$

are the coefficients that determine the electric and magnetic fields in $j^{th}$ layer; and M is a 4×4 transfer matrix that depends on $k_z$, w, m, the geometry of the layers, and their indices of refraction. After calculating the electromagnetic fields for a given point ($k_z$, $\omega$), it is found that the resonant modes by examining the fractional E-field power confinement in the coaxial waveguiding region, i.e., $$\int_{r_i < r < r_o} dr \varepsilon(r) |E(r)|^2 \omega \bigg/ \int_{all\text{-}layers} dr \varepsilon(r) |E(r)|^2 \omega.$$

The second approach involves a numerical solution of Maxwell's equations in the frequency domain using the conjugate gradient method within the supercell approximation. Supercells of size (30a×30a×0.1a) were employed leading to a basis set of about 230,000 plane waves. Eigenvalues were considered converged when the residue was less than $10^{-6}$. The results of both approaches were found to agree to better than 0.1%.

Figure 6C:
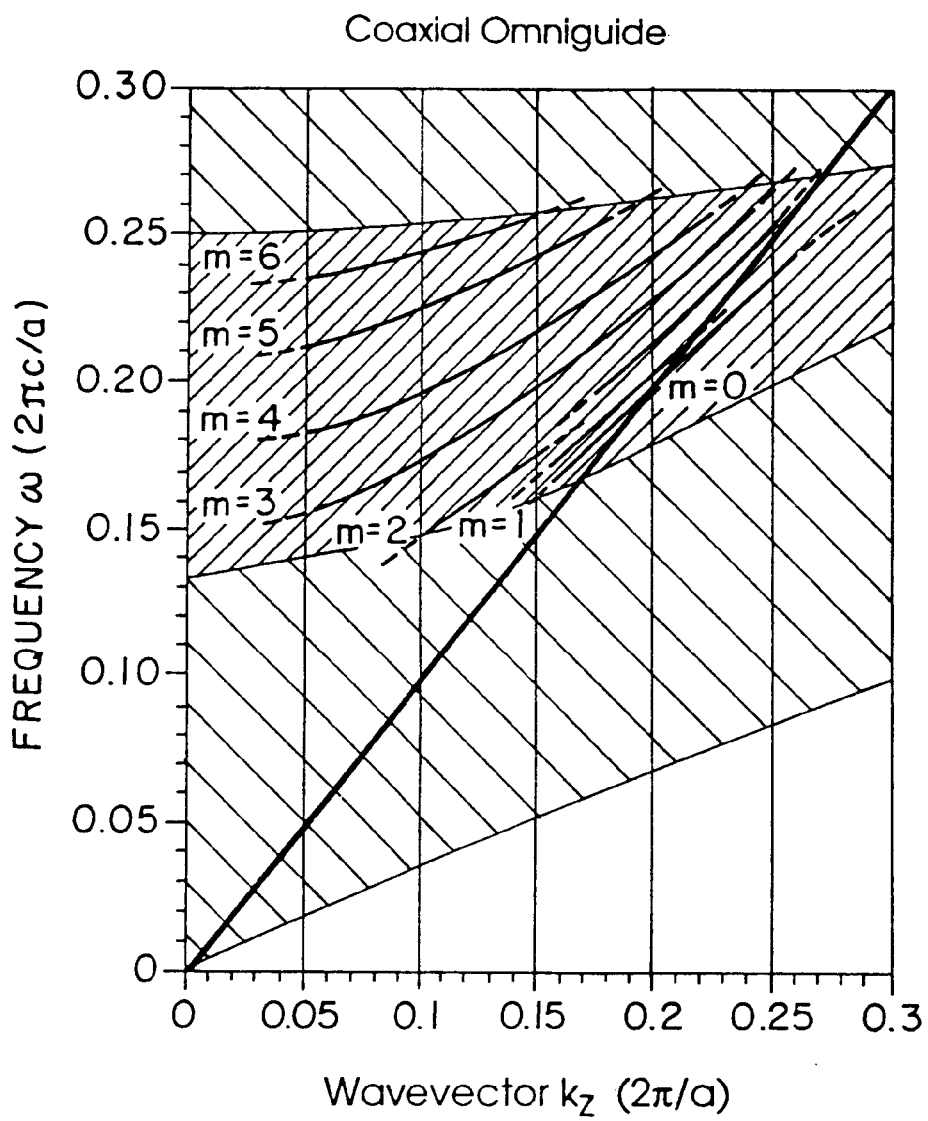
FIG. 6C is a graph of the projected band structure for the coaxial omniguide for guided modes with angular momentum m=0, 1, 2, . . . ; for each figure angular frequency $\omega$ is expressed in units of $2\pi c/a$ and the axial wave vector $k_z$ is expressed in units of $2\pi/a$.
Figure 7A:
FIGS. 7A, 7B, 7C, and 7D are power density graphs which are plotted in the electric field at axial wave vector $k_z=0.19$ ($2\pi/a$) for the four lowest frequency modes (having angular momentum m=0, 1, 2, and 3, respectively) of FIG. 6C.
Figure 7A:
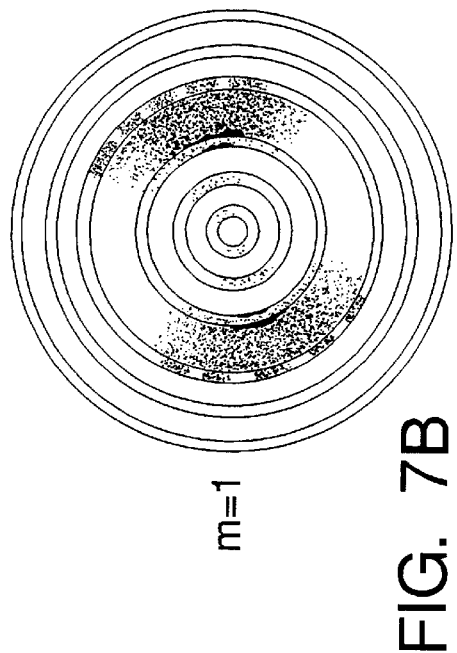
Figure 7B:
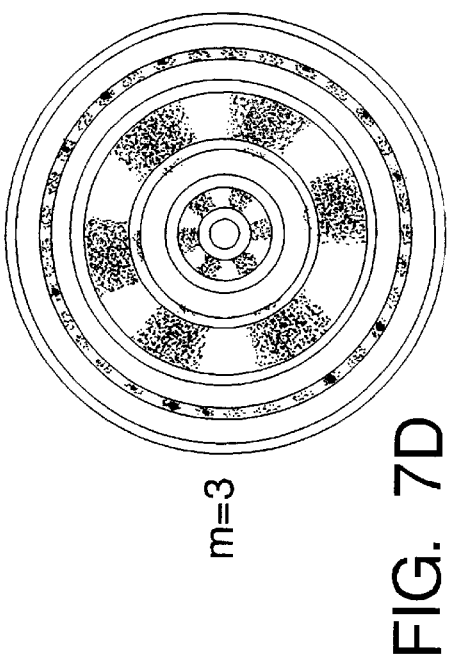
Figure 7C:
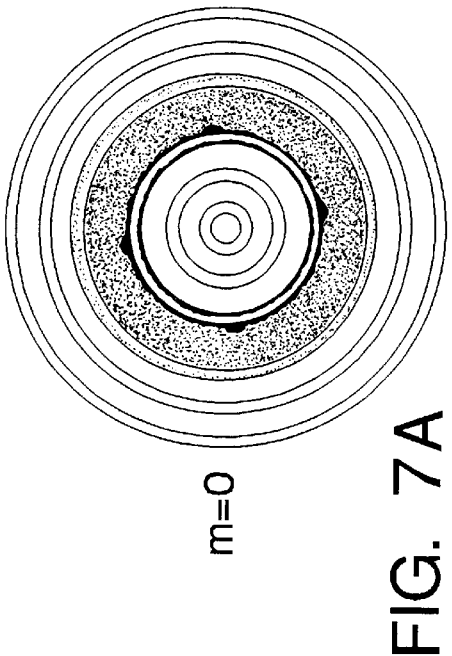
Figure 7D:
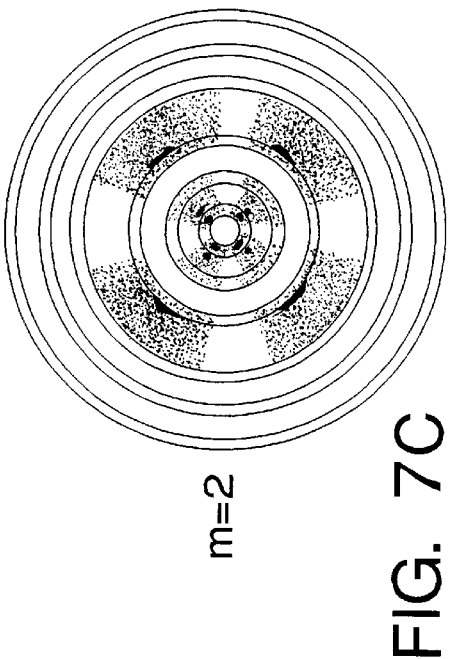

The projected band structure for the coaxial omniguide 510 is shown in the graph of FIG. 6C. The lines denoted by angular momentum indices m=0, 1, 2, 3, 4, 5, and 6, respectively, represent guided modes localized within the region defined by the inner and outer coaxial radii of the waveguide. The dashed lines represent modes with less than 20% localization within the coaxial region. Note the close correspondence between the modes within the omnidirectional reflectivity range labeled m=1 to m=6 and those of the coaxial cable labeled $TE_{11}$ to $TE_{61}$. The small discontinuity in m=2 arises from a weak coupling to a resonant mode of the same symmetry localized deep within the core region. Note also that the m=0 mode appears to correspond to the TEM mode. Of course, for a coaxial omniguide with a limited number of outer shells, these modes can only exist as resonances.

Even with only 2.5 bilayers, the modes can be extremely well-localized resonances and the leakage-rate decreases exponentially with the number of shells. The strong localization is shown in the power density graphs of FIGS. 7A–7D. Here, the power density is plotted in the electric field for the four lowest frequency modes at $k_z = 0.19$ ($2\pi/a$) in FIG. 6C. As the color bar indicates, power increases in going black to dark-red, to red, to orange, to yellow. The blue circles identify the boundaries between the various dielectric shells. It will be appreciated that in all cases the power is confined primarily within the coaxial region. This is particularly true for the m=0 mode, which is also cylindrically symmetric just like the TEM mode. Although it is well known that a waveguide consisting only of dielectric material cannot support a true TEM mode, it is found that the m=0 mode, which is a pure TM mode, possesses several of the characteristics of the TEM mode.

Initially, as previously described, the coaxial omniguide has zero angular momentum and hence a radially symmetric electric field distribution. Also, the electric and magnetic fields within the coaxial waveguiding region (where over 65% of the power is concentrated) are nearly identical to those of the metallic coaxial cable, e.g., the predominant components are $E_r$ and $H_\phi$ and vary as 1/r. Finally, at the point where the m=0 dispersion curve (line 608) crosses the light line, there is an exact correspondence between the electromagnetic fields of the coaxial omniguide and metallic coaxial cable, inside the coaxial region. Moreover, the derivative of the group velocity is exactly zero near this point, leading to nearly dispersionless propagation throughout its vicinity. For simplicity, the intrinsic waveguide dispersion is considered in all calculations. In an actual waveguide, material dispersion would be present, which can be compensated for in the standard manner by judicious tuning of the waveguide parameters. Indeed, the multitude of available parameters for the coaxial omniguide provides a much greater flexibility to accomplish this than in the case of an optical fiber.

The characteristics described above are certainly the attributes one would hope to achieve in order to overcome problems with polarization-rotation and pulse-broadening. The bands shown in FIG. 6C are clearly multi-mode, i.e. for a given frequency there are two or more guided modes that can be excited. To design a coaxial omniguide that can support single-mode behavior, only structural parameters need to be adjusted. It is easier to keep the parameters of the bilayers fixed, so that the omnidirectional reflectivity frequency range does not change. This leaves only those parameters that are common to both the coaxial omniguide and the metallic coaxial cable, i.e., the inner and outer radii of the coaxial waveguiding region.

Single-mode operation for the TEM-like mode will only be possible if all other modes are moved up in frequency so that the lowest non-zero angular mode has its cut-off frequency inside the bandgap. To do this, the inner radius of the coaxial waveguiding region needs to be decreased. At the same time the thickness of the bilayers, a, should remain constant, which means that three bilayers in the inner part of the waveguide can no longer be accommodated. The inner radius has to be decreased so much that one is forced to discard the periodic structure in the inner region and to replace it with a single dielectric rod. Loss of the inner core mirror-structure is not crucial, however. What is important is to add a thin rod of dielectric in the core in order to avoid the 1/r divergence of the field at the origin and to use a dielectric of high enough contrast to localize the TEM-like mode in the coaxial region. This approach, however, will not work if $r_i > a$ and one must then revert to a multilayer core.

Figure 5C:
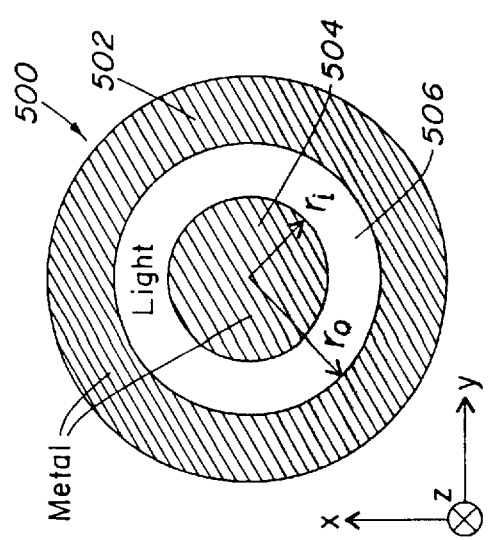

Testing different values for the inner and outer radii of the waveguiding region, a configuration that has the desired properties has been found. This exemplary embodiment, coaxial omniguide 520, is shown in FIG. 5C. A central dielectric rod 521 has an index of refraction $n_1 = 4.6$ and a radius $r_i = 0.40a$. The coaxial waveguiding region has an outer radius, $r_o = 1.40a$, and the parameters of the outer bilayers 522 and 524 are the same as those used for the coaxial omniguide 510. In omniguide 520, there are two frequency ranges where the waveguide can operate in a single-mode fashion. This can be seen in FIG. 8, which is a graph showing a plot of the dispersion curves for the modes supported by the coaxial omniguide 520. The hollow dots indicate more than 50% confinement of the electric field power, while the solid dots represent confinement between 20% and 50%. The dashed lines indicate confinement that is less than 20%. The two outlined boxes identify the frequency ranges where the m=0 band is single-mode.

Figure 8:
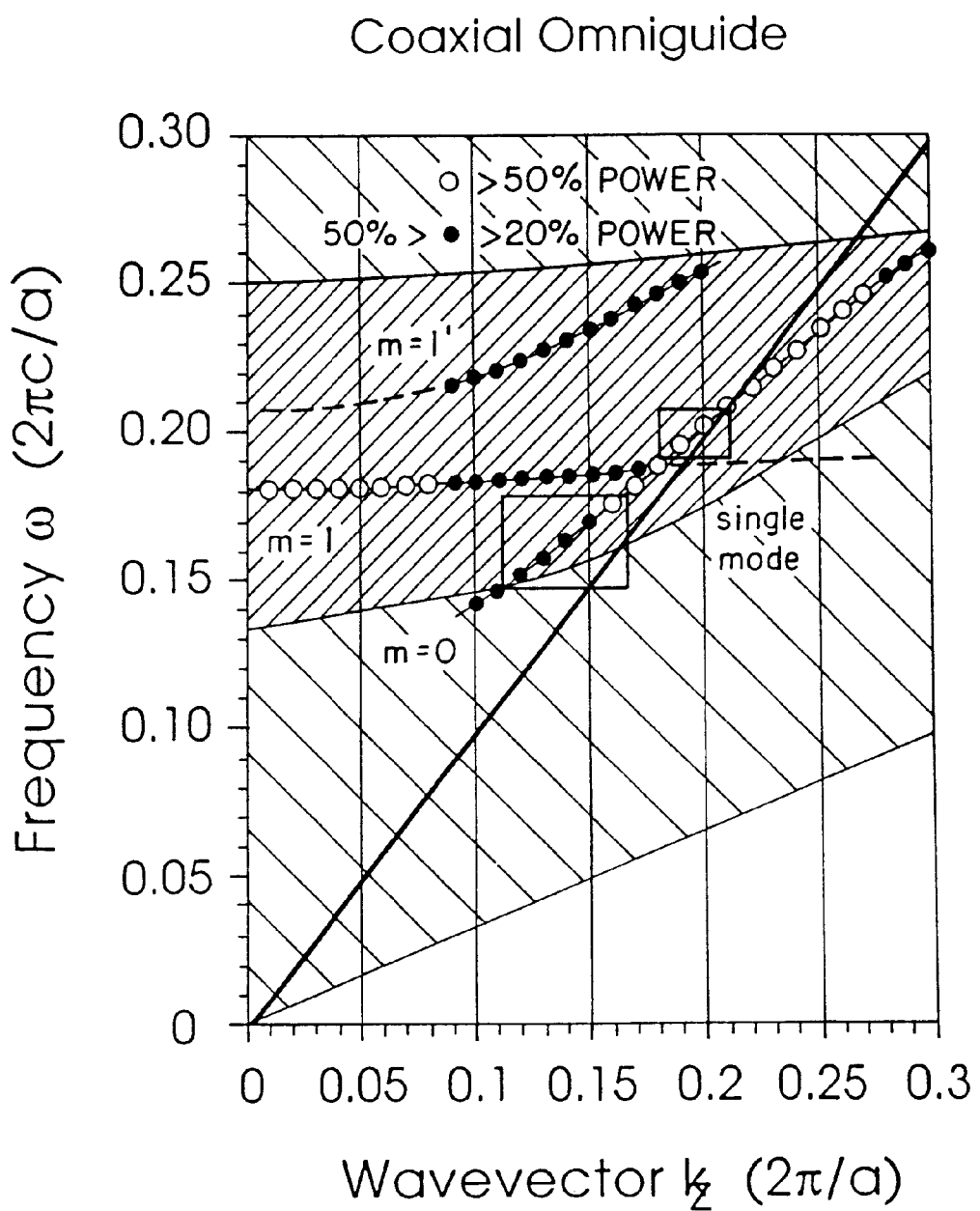
FIG. 8 is a graph showing a plot of the dispersion curves for the modes supported by the coaxial omniguide of FIG. 5C, specifically showing the m=0, m=1, and m=1' modes, and where angular frequency $\omega$ is expressed in units of $2\pi c/a$ and the axial wave vector $k_z$ is expressed in units of $2\pi/a$.

A comparison of FIG. 6C and FIG. 8, reveals that the cut-off frequency of the m=1 band has shifted significantly upwards, while the m=0 band remains relatively unchanged. The flatness of the m=1 band enables the TEM-like band to be single-mode both above it and below it in frequency. The exact values of the parameters were chosen so that, in the middle of the higher-frequency single-mode window (at $\omega = 0.205(2\pi c/a)$), the mode is also dispersionless. The very small group velocity exhibited by the m=1 mode can be driven even to negative values with a proper choice of waveguide parameters.

FIGS. 9A–9C show the distribution of the electric field components for the m=0 mode of the coaxial omniguide 520 at $k_z = 0.2 (2\pi/a)$ and $\omega 0.203 (2\pi c/a)$. The color bar indicates that large positive and negative values are shown as dark red and dark blue regions, respectively, while white (light-colored) areas represent regions of zero (low) values of electric field. It will be appreciated that the field distribution clearly reveals a high confinement of the mode in the coaxial waveguiding region and that in this region it is nearly completely transverse to the direction of propagation (less than $10^{-3}$ of the intensity is along z), as desired.

Since the $(k_z, \omega)$ point is very close to the light line, the electric field in the waveguiding region is almost completely transverse to the direction of propagation. Note that the z component of the magnetic field will always be zero since this is a pure TM mode. The field distribution clearly reveals a high confinement of the mode in the waveguiding region, as desired. Moreover, these values of $E_x$ and $E_y$ lead to a net field distribution that is completely radially symmetric, consistent with an angular component that is exactly zero. All the features mentioned above attest to the close correspondence between the m=0 mode and a pure TEM mode.

There exist three additional advantageous features of the coaxial omniguide of the invention. The first is that the multitude of adjustable parameters in the structure of a coaxial omniguide (the index of refraction and thickness of each layer, the thickness of a bilayer, the waveguiding region inner and outer radii, the central rod index of refraction, etc.) allows for great flexibility in tuning the waveguide for optimal desired performance (confinement in waveguiding region, width of single-mode window, frequency of zero dispersion, group velocity, etc.). The second favorable feature is that radial confinement of the light is a consequence of omnidirectional reflection, and not total internal reflection. This means that the coaxial omniguide can be used to transmit light around much sharper corners than the optical fiber. Finally, the radial decay of the electromagnetic field in the coaxial omniguide is much greater than in the case of the optical fiber, i.e., with only 10 bilayers one gets a decrease of electric field intensity of about six orders of magnitude. This means that, for guided light of the same wavelength, the outer diameter of the coaxial omniguide can be much smaller than the diameter of the cladding layer of the optical fiber without leading to cross-talk complications in waveguide bundles. These enabling characteristics of substantially smaller waveguide bending radius and smaller spacing of adjacent waveguides, lead to the possibility of significant miniaturization of future integrated optical devices.

Although the present invention has been shown and described with respect to several preferred embodiments thereof, various changes, omissions and additions to the form and detail thereof, may be made therein, without departing from the spirit and scope of the invention.

What is claimed is:

1. An all-dielectric coaxial waveguide comprising:
    a dielectric core region;
    an annulus of dielectric material, surrounding said core region, in which electromagnetic radiation is confined; and
    an outer region of cylindrically coaxial dielectric shells of alternating indices of refraction surrounding said annulus, wherein
    said core region and said outer region have an average index of refraction which is higher than the index of refraction of said annulus.

2. The waveguide of claim 1, wherein said core region comprises a dielectric rod.

3. The waveguide of claim 2, wherein said core region further comprises an inner region of cylindrically coaxial dielectric shells of alternating indices of refraction surrounding said rod.

4. The waveguide of claim 3, wherein said rod comprises a low dielectric material.

5. The waveguide of claim 1, wherein said waveguide is utilized to guide high power electromagnetic radiation around bends.

6. The waveguide of claim 1, wherein said waveguide comprises a circular cross section.

7. The device of claim 1, wherein said outer region comprises alternating shells of low and high dielectric materials.

8. The waveguide of claim 1, wherein said waveguide is utilized to guide high power electromagnetic radiation.

9. The waveguide of claim 1 further comprising:

a second annulus of dielectric material, surrounding said outer region, in which electromagnetic radiation is confined; and a second outer region of cylindrically coaxial dielectric shells of alternating indices of refraction surrounding said second annulus.

10. The waveguide of claim 9 further comprising a sequence of a plurality of alternating annuli and further outer regions, each annuli being of a dielectric material in which electromagnetic radiation is confined, each further outer region having cylindrically coaxial dielectric shells of alternating indices of refraction surrounding a respective one of the plurality of annuli.

11. The waveguide of claim 10, wherein said core region and said plurality of outer regions have an average index of refraction which is higher than the index of refraction of said plurality of annuli.

12. An all-dielectric coaxial waveguide which exhibits omnidirectional reflection, comprising:

a dielectric core region;

an annulus of dielectric material in which electromagnetic radiation in confined; and an outer region of cylindrically coaxial dielectric shells of alternating indices of refraction surrounding said annulus, wherein said refractive indices, the number of shells, and thickness of said outer region result in a reflectivity for a planar geometry that is greater than 95% for angles of incidence ranging from 0° to at least 80° for all polarizations for a range of wavelengths of said electromagnetic radiation.

* * * * *

UNITED STATES PATENT AND TRADEMARK OFFICE
CERTIFICATE OF CORRECTION

PATENT NO. : 6,573,813 B1
DATED : June 3, 2003
INVENTOR(S) : Yoel Fink et al.

It is certified that error appears in the above-identified patent and that said Letters Patent is hereby corrected as shown below:

Title page,
Item [54], Title, delete "WITH ANNULAR SECTIONS"

Column 1,
Lines 7 and 64, replace "∈" with -- $\varepsilon$ --

Column 3,
Line 22, replace "wave guide" with -- waveguide --

Column 4,
Lines 51 and 53, replace "∈" with -- $\varepsilon$ --

Column 5,
Line 5, replace "∈" with -- $\varepsilon$ --
Line 6, replace "∈" with -- $\varepsilon$ -- in two occurrences
Line 7, insert -- In an alternative embodiment, the core region part 202 and all shells of the core region part 204 can have the same dielectric constant. Also, the two core region parts can be combined as one material structure such as a single rod of one dielectric material. --
Line 12, replace "rigs" with -- rings --

Signed and Sealed this

Eleventh Day of November, 2003

JAMES E. ROGAN
*Director of the United States Patent and Trademark Office*